United States Patent
Sonksen et al.

(10) Patent No.: US 7,398,335 B2
(45) Date of Patent: Jul. 8, 2008

(54) METHOD AND SYSTEM FOR DMA OPTIMIZATION IN HOST BUS ADAPTERS

(75) Inventors: Bradley S. Sonksen, Margarita, CA (US); Kuangfu D. Chu, Irvine, CA (US); Rajendra R. Gandhi, Laguna Niguel, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 387 days.

(21) Appl. No.: 10/994,829

(22) Filed: Nov. 22, 2004

(65) Prior Publication Data

US 2006/0112199 A1    May 25, 2006

(51) Int. Cl.
*G06F 13/00* (2006.01)
*G06F 15/16* (2006.01)
*G06F 13/28* (2006.01)

(52) U.S. Cl. .................... 710/35; 709/232; 710/18; 710/22

(58) Field of Classification Search .................. 710/35
See application file for complete search history.

(56) References Cited

U.S. PATENT DOCUMENTS

| | | | |
|---|---|---|---|
| 4,268,906 A | 5/1981 | Bourke et al. | |
| 4,333,143 A | 6/1982 | Calder | |
| 4,449,182 A | 5/1984 | Rubinson | |
| 4,549,263 A | 10/1985 | Calder | |
| 4,777,595 A | 10/1988 | Strecker et al. | |
| 4,783,730 A | 11/1988 | Fischer | |
| 4,783,739 A | 11/1988 | Calder | |
| 4,803,622 A | 2/1989 | Bain, Jr. et al. | |
| 5,129,064 A | 7/1992 | Fogg, Jr. et al. | |
| 5,212,795 A | 5/1993 | Hendry | |
| 5,249,279 A | 9/1993 | Schmenk et al. | |
| 5,276,807 A | 1/1994 | Kodama et al. | |
| 5,321,816 A | 6/1994 | Rogan et al. | |
| 5,347,638 A | 9/1994 | Desai et al. | |
| 5,371,861 A | 12/1994 | Keener et al. | |
| 5,448,702 A | 9/1995 | Garcia, Jr. et al. | |
| 5,568,614 A | 10/1996 | Mendelson et al. | 709/231 |
| 5,613,162 A * | 3/1997 | Kabenjian | 710/22 |

(Continued)

FOREIGN PATENT DOCUMENTS

EP    0542417    5/1993

(Continued)

*Primary Examiner*—Henry Tsai
*Assistant Examiner*—Michael Sun
(74) *Attorney, Agent, or Firm*—Klein O'Neill & Singh, LLP

(57) ABSTRACT

Method and system for optimizing DMA request processing is provided. The system includes a HBA that uses a dynamic DMA maximum write burst count sizing to optimize processing of write and read requests, wherein the HBA includes a DMA optimizer module that selects a certain write burst size to adjust performance when read and write DMA requests are being utilized. The DMA optimizer module can toggle between write and read request priority based on a maximum write request burst size. A shorter maximum write burst size provides more opportunity to issue read requests and a larger maximum burst size provides a better write request performance. The method includes, evaluating a read request throughput rate; evaluating a write request throughput rate; evaluating a read request utilization rate; evaluating a write request utilization rate; and adjusting a maximum write burst size.

20 Claims, 9 Drawing Sheets

U.S. PATENT DOCUMENTS

| | | | |
|---|---|---|---|
| 5,671,365 A | 9/1997 | Binford et al. | |
| 5,740,467 A | 4/1998 | Chmielecki, Jr. et al. | |
| 5,758,187 A | 5/1998 | Young | |
| 5,761,427 A | 6/1998 | Shah et al. | |
| 5,828,903 A | 10/1998 | Sethuram et al. | |
| 5,875,343 A | 2/1999 | Binford et al. | |
| 5,881,296 A | 3/1999 | Williams et al. | |
| 5,892,969 A | 4/1999 | Young | |
| 5,905,905 A | 5/1999 | Dailey et al. | |
| 5,917,723 A | 6/1999 | Binford | 700/2 |
| 5,968,143 A | 10/1999 | Chisholm et al. | |
| 5,983,292 A | 11/1999 | Nordstrom et al. | |
| 6,006,340 A | 12/1999 | O'Connell | |
| 6,049,802 A | 4/2000 | Waggener, Jr. et al. | |
| 6,055,603 A | 4/2000 | Ofer et al. | |
| 6,078,970 A | 6/2000 | Nordstrom et al. | |
| 6,085,277 A | 7/2000 | Nordstrom et al. | |
| 6,115,761 A | 9/2000 | Daniel et al. | |
| 6,138,176 A | 10/2000 | McDonald et al. | |
| 6,185,620 B1 | 2/2001 | Weber et al. | 709/230 |
| 6,233,244 B1 | 5/2001 | Runaldue et al. | |
| 6,269,413 B1 | 7/2001 | Sherlock | |
| 6,343,324 B1 | 1/2002 | Hubis et al. | |
| 6,393,500 B1 | 5/2002 | Thekkath | |
| 6,434,630 B1 | 8/2002 | Micalizzi, Jr. et al. | |
| 6,457,090 B1 | 9/2002 | Young | 710/313 |
| 6,463,032 B1 | 10/2002 | Lau et al. | |
| 6,473,814 B1 * | 10/2002 | Lyons et al. | 710/35 |
| 6,502,189 B1 | 12/2002 | Westby | 713/1 |
| 6,504,846 B1 | 1/2003 | Yu et al. | |
| 6,546,010 B1 | 4/2003 | Merchant et al. | |
| 6,564,271 B2 | 5/2003 | Micalizzi, Jr. et al. | |
| 6,615,308 B1 * | 9/2003 | Fanning | 711/105 |
| 6,721,799 B1 | 4/2004 | Slivkoff | 709/236 |
| 6,810,440 B2 | 10/2004 | Micalizzi, Jr. et al. | |
| 6,810,442 B1 | 10/2004 | Lin et al. | |
| 6,826,636 B2 * | 11/2004 | Liang | 710/35 |
| 6,907,478 B2 * | 6/2005 | Li et al. | 710/33 |
| 2002/0199040 A1 * | 12/2002 | Irwin et al. | 710/22 |
| 2003/0033461 A1 * | 2/2003 | Malik et al. | 710/107 |
| 2003/0056000 A1 | 3/2003 | Mullendore et al. | |
| 2003/0131161 A1 * | 7/2003 | Dodd et al. | 710/35 |
| 2003/0188007 A1 * | 10/2003 | Unger | 709/232 |
| 2003/0236953 A1 | 12/2003 | Grieff et al. | |

FOREIGN PATENT DOCUMENTS

| | | |
|---|---|---|
| EP | 0738978 | 10/1996 |
| JP | 10326248 | 8/1998 |
| WO | WO 95/06286 | 3/1995 |
| WO | WO 00/58843 | 10/2000 |

\* cited by examiner

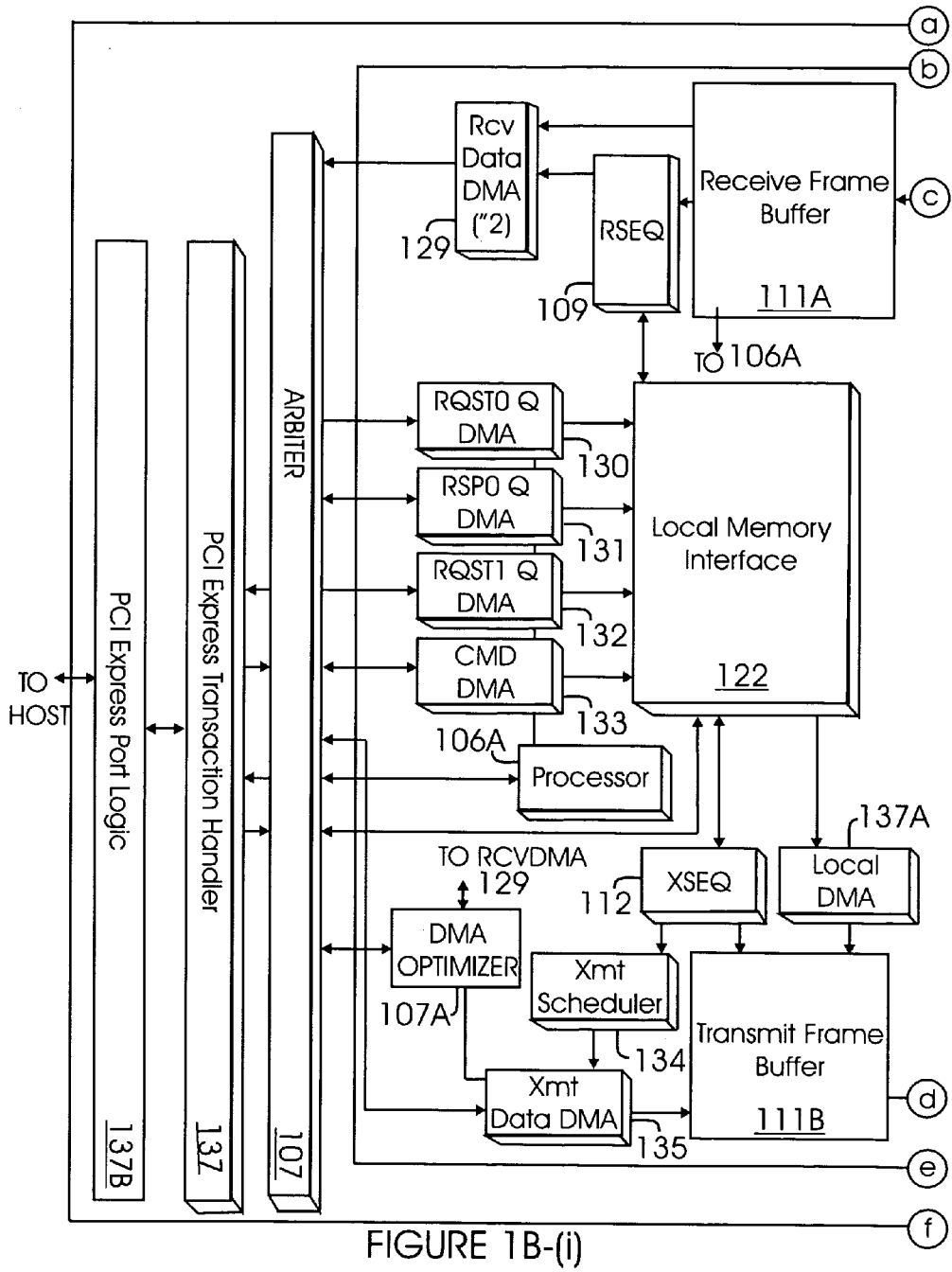
FIGURE 1B-(i)

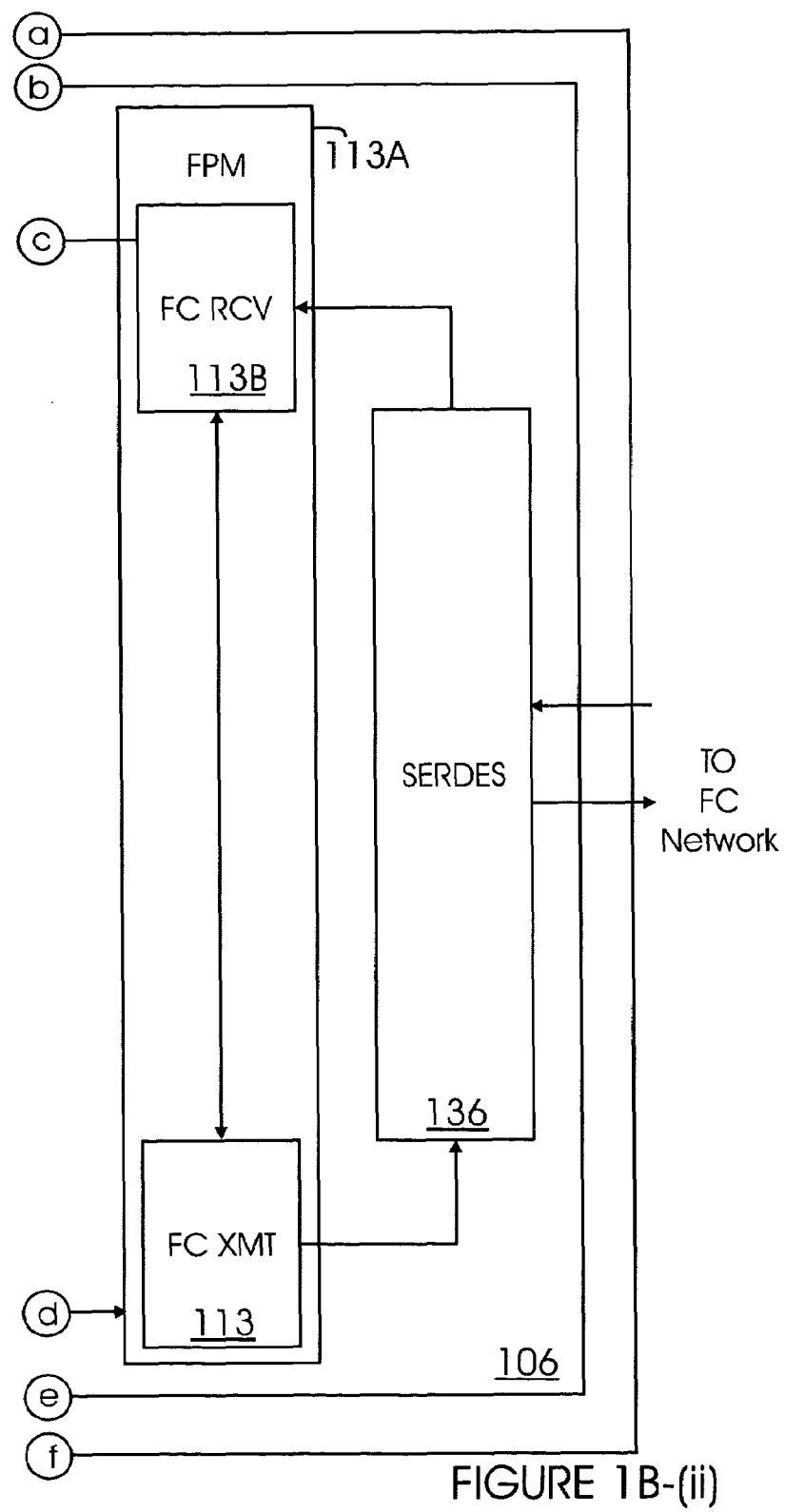
FIGURE 1B-(ii)

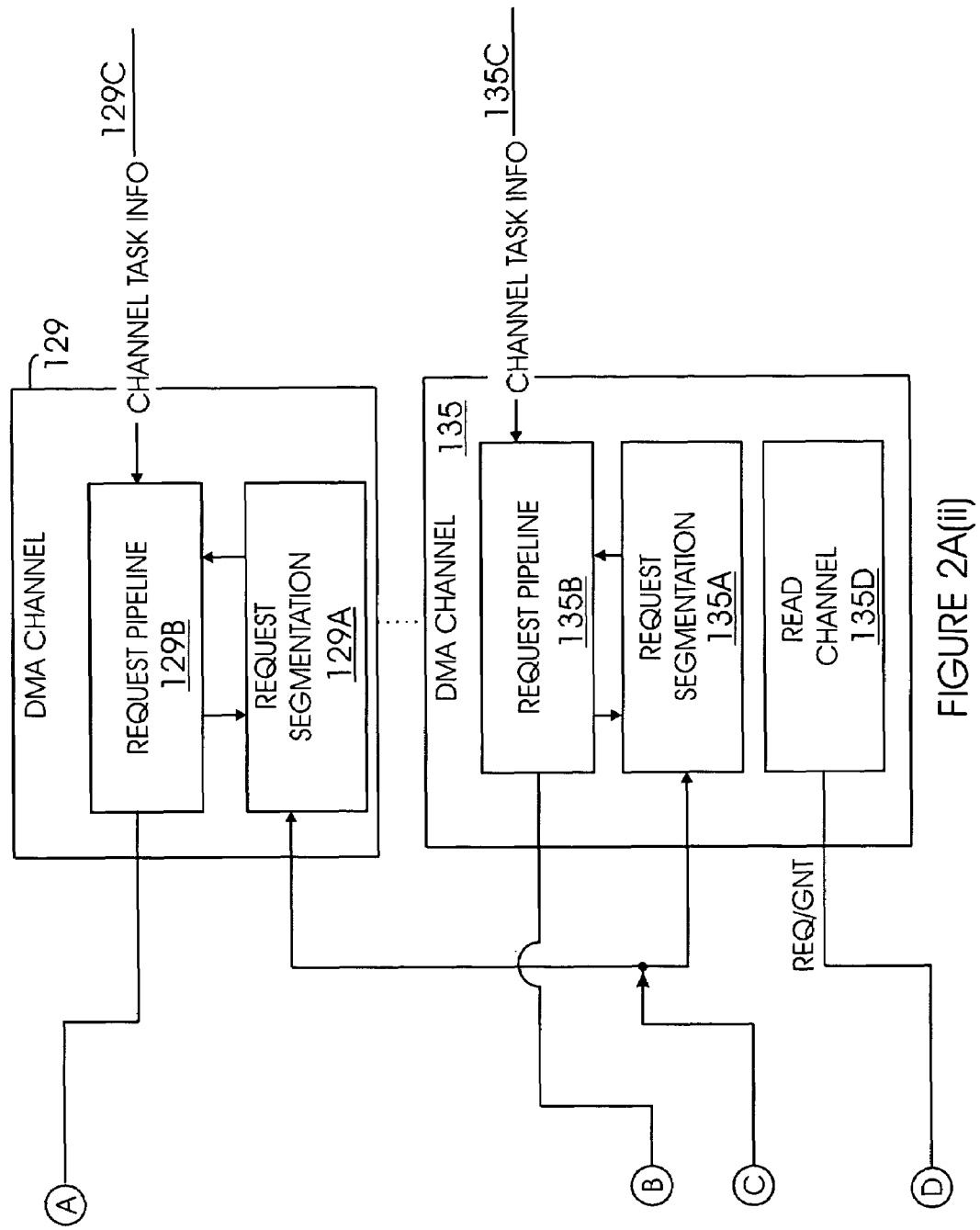
FIGURE 2A(ii)

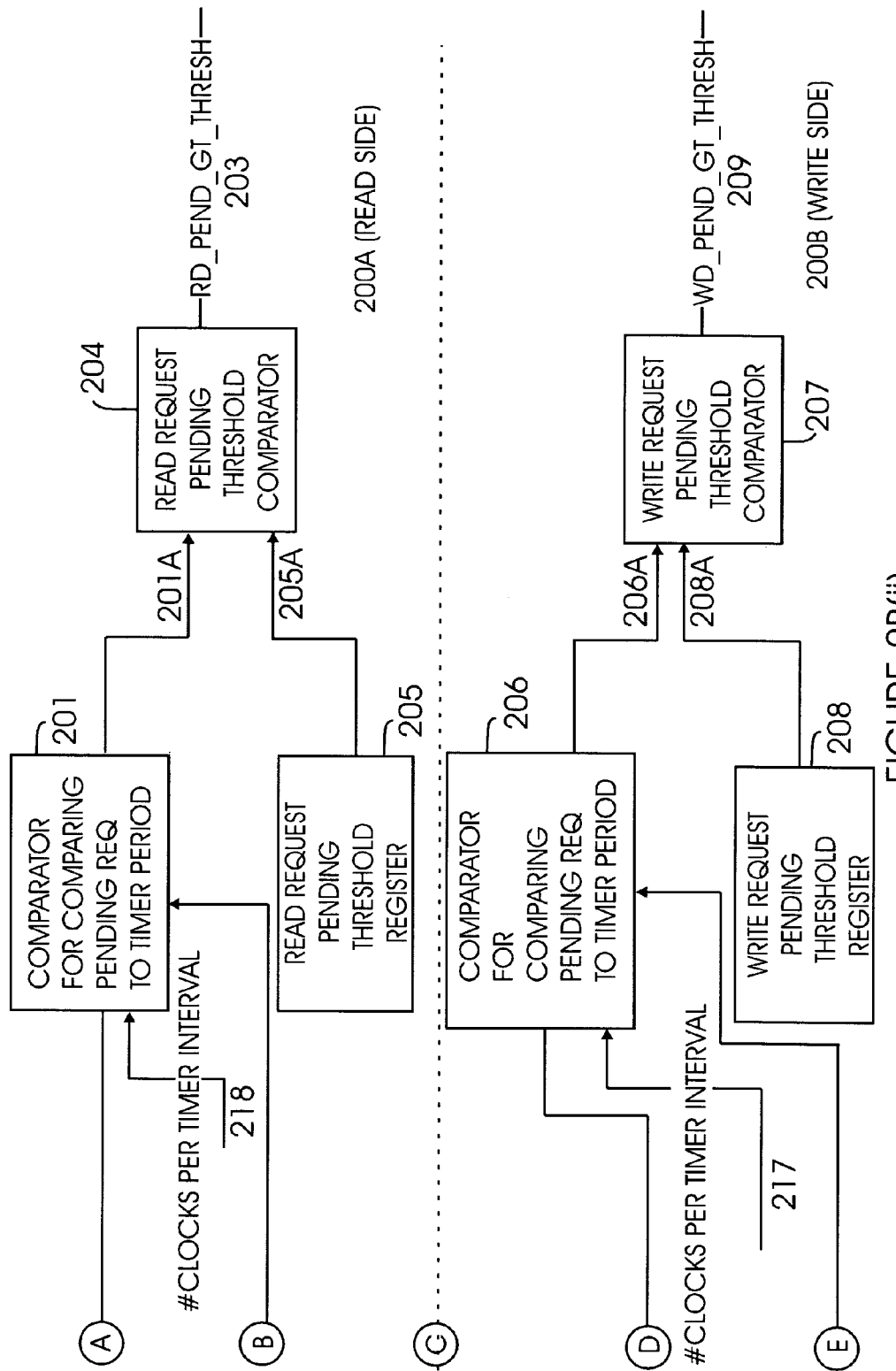
FIGURE 2B(ii)

METHOD AND SYSTEM FOR DMA OPTIMIZATION IN HOST BUS ADAPTERS

BACKGROUND

1. Field of the Invention

The present invention relates to computing systems, and more particularly to optimizing direct memory access ("DMA") channel performance.

2. Background of the Invention

Storage area networks ("SANs") are commonly used where plural memory storage devices are made available to various host computing systems. Data in a SAN is typically moved from plural host systems (that include computer systems, servers etc.) to the storage system through various controllers/adapters.

Host systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety.

PCI-Express is another Input/Output ("I/O") bus standard (incorporated herein by reference in its entirety) that is compatible with existing PCI cards using the PCI bus. PCI-Express uses discrete logical layers to process inbound and outbound information. The logical layers are a Transaction Layer, a Data Link Layer ("DLL") and a Physical Layer ("PHY"). PCI-Express uses separate links to transmit and receive information.

PCI-Express uses a packet-based protocol to exchange information between Transaction layers. Transactions are carried out using Requests and Completions.

The Transaction Layer assembles and disassembles Transaction Layer Packets ("TLPs"). TLPs are used to communicate transactions, such as read and write and other type of events.

Various other standard interfaces are also used to move data from host systems to storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others.

DMA modules are used by HBAs to perform data transfers between memory locations, or between memory locations and an input/output port. DMA units provide address and bus control signals to and from a device for a read and/or write cycle.

A DMA read request is a request from a DMA module (or channel) to an arbitration module to transfer data from a host system to a storage device. A DMA write request is a request from a DMA module to an arbitration module to transfer data from the storage device to a host system.

Specific channels are implemented in a DMA unit to allow storage devices to transfer data directly to and from memory storage devices. A channel can be activated by a DMA request signal (DREQ) from a storage device or a host system. The DMA unit receives the DREQ, provides a DMA acknowledged signal (DACK), and transfers the data over the channel to or from the storage device.

HBAs typically use multiple DMA channels and have an arbitration module that arbitrates access to a PCI-Express link. This allows an HBA to arbitrate and switch contexts (between channels) by actively processing command, status and data. Multiple channels are serviced in periodic bursts.

Typically, DMA write requests may be processed by writing data using multiple PCI-Express write request packets. A new DMA request (read or write) can only be processed if a previous DMA read and/or DMA write request has been processed. DMA read requests (with no data) are issued to generate Read Transfer requests, which transfers data from the host to a storage device. Write requests from the storage device to a host system are generated using the same side of the PCI-Express interface. The same transmit link (in the PCI-Express interface) is shared for write transfers and read requests.

The time to service a write request can be longer compared to servicing the read request because write request packets (TLPs) also transfer payload data. Also, delay in issuing read request packets can stall data transfer from a host to a storage device.

Therefore, there is a need for a method and system to optimize DMA read and write request processing that allows both read and write data transfers to be conducted efficiently.

SUMMARY OF THE INVENTION

In one aspect of the present invention, a storage area network ("SAN") is provided. The SAN includes a HBA that uses a dynamic DMA maximum write burst count sizing to optimize processing of write and read requests, wherein the HBA includes a DMA optimizer module that selects a certain write burst size to adjust performance when read and write DMA requests are being utilized. The DMA optimizer module can toggle between write and read request priority based on a maximum write request burst size. A shorter maximum write burst size provides more opportunity to issue read requests and a larger maximum burst size provides a better write request performance.

In yet another aspect of the present invention, a HBA is provided that includes a DMA optimizer module that selects a certain write burst size to adjust performance when read and write DMA requests are being utilized for sizing a maximum DMA write burst count to optimize processing of write and read requests.

In yet another aspect of the present invention, a method for processing direct memory access requests in a HBA are provided. The method includes, evaluating a read request throughput rate; evaluating a write request throughput rate; evaluating a read request utilization rate; evaluating a write request utilization rate; and adjusting a maximum write burst size.

The maximum write burst size is increased if the read request utilization rate and the write request utilization rate are higher than a threshold value and the read throughput rate is greater than the write throughput rate. The maximum write burst size is decreased if the read request utilization rate and the write request utilization rate are higher than a threshold value and the write throughput rate is greater than the read throughput rate.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B is a block diagram of a host bus adapter with a DMA optimizer, according to one aspect of the present invention;

DETAILED DESCRIPTION OF THE PREFERRED EMBODIMENTS

To facilitate an understanding of the preferred embodiment, the general architecture and operation of a SAN, and a HBA will be described. The specific architecture and operation of the preferred embodiment will then be described with reference to the general architecture of the host system and HBA.

Figure 1A:
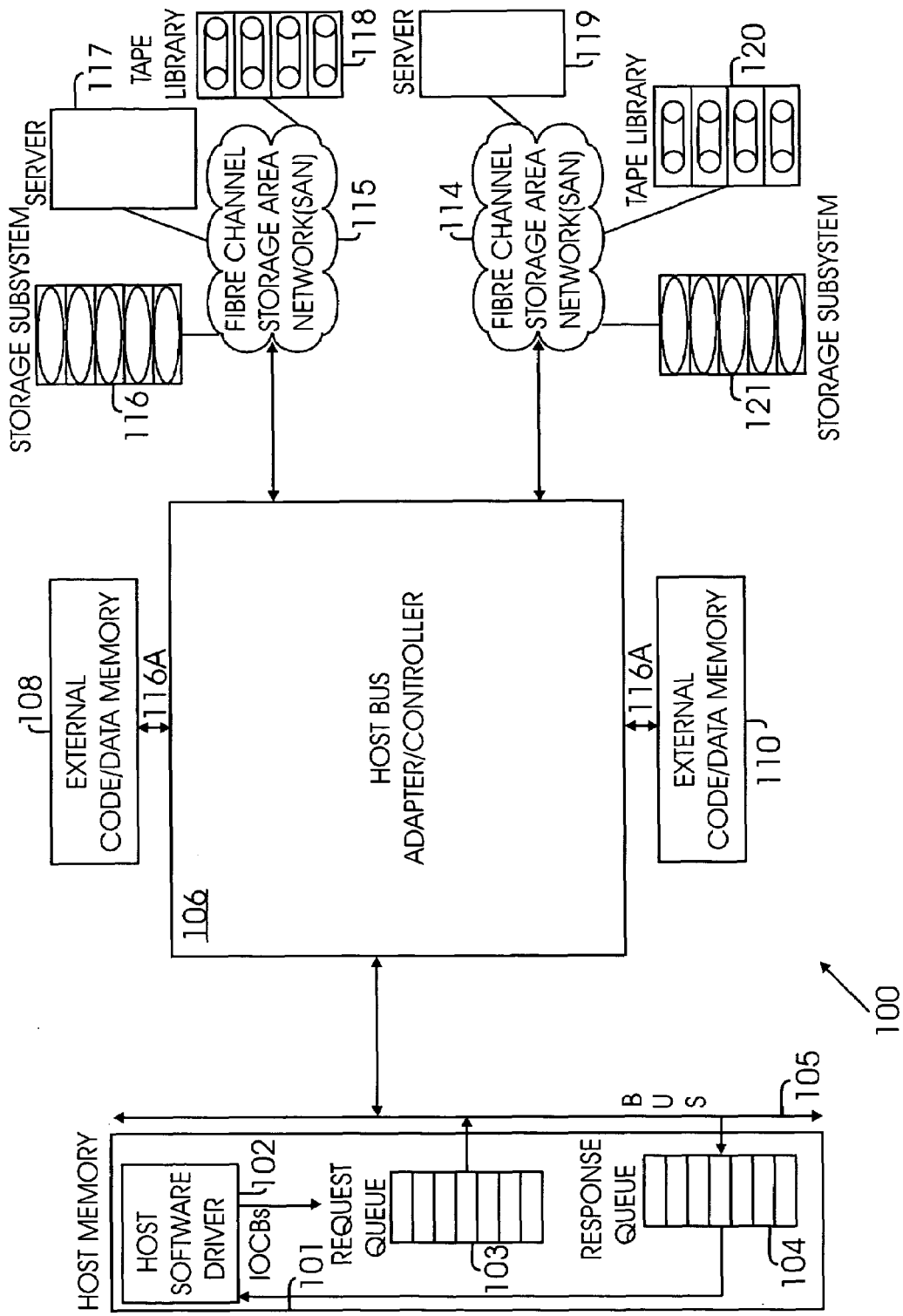
FIG. 1A is a block diagram showing various components of a SAN.

SAN Overview:

FIG. 1A shows a SAN system 100 that uses a HBA 106 (referred to as "adapter 106") for communication between a host system with host memory 101 to various storage systems (for example, storage subsystem 116 and 121, tape library 118 and 120) using fibre channel storage area networks 114 and 115. Host memory 101 includes a driver 102 that co-ordinates all data transfer via adapter 106 using input/output control blocks ("IOCBs"). Servers 117 and 119 can also access the storage sub-systems using SAN 115 and 114, respectively.

A request queue 103 and response queue 104 is maintained in host memory 101 for transferring information using adapter 106. Host system communicates with adapter 106 via a PCI-Express bus 105.

HBA 106:

FIG. 1B shows a block diagram of adapter 106. Adapter 106 includes processors (may also be referred to as "sequencers") "XSEQ" 112 and "RSEQ" 109 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113A that includes modules 113B and 113 in receive and transmit paths, respectively (shown as "FC RCV" and "FC XMT"). Modules 113B and 113 allow data to move to/from storage systems.

Adapter 106 is also coupled to external memory 108 and 110 via connection 116A (FIG. 1A) (referred interchangeably, hereinafter) and local memory interface 122. Memory interface 122 is provided for managing local memory 108 and 110. Local DMA module 137A is used for gaining access to move data from local memory (108/110). Adapter 106 also includes a serial/de-serializer 136 for converting data from 10-bit to 8-bit format and vice-versa.

Adapter 106 also includes request queue DMA channel (0) 130, response queue DMA channel 131, request queue (1) DMA channel 132 that interface with request queue 103 and response queue 104; and a command DMA channel 133 for managing command information. DMA channels are coupled to arbiter 107 that receives requests and grants access to a certain channel.

Both receive and transmit paths have DMA modules "RCV DATA DMA" 129 and "XMT DATA DMA" 135 that are used to gain access to a channel for data transfer in the receive/transmit paths. Transmit path also has a scheduler 134 that is coupled to processor 112 and schedules transmit operations.

A host processor (not shown) sets up shared data structures in buffer memory 108. A host command is stored in buffer 108 and the appropriate sequencer (i.e., 109 or 112) is initialized to execute the command.

Various DMA units (or channels, used interchangeably throughout this specification) (for example, 129, 130, 131, 132, 133 and 135) send a request to arbiter 107. When a request is granted, the DMA unit is informed of the grant and memory access is granted to a particular channel.

Arbiter 107 is coupled to a PCI-Express Transaction Handler (PTH) 137. PTH 137 is coupled to PCI-Express port logic 137B that moves information to/from a host system. PTH 137 has also been referred to as PCI-Express interface and includes a receive side and transmit side link that allows communication between the host system and adapter 106. The transmit side receives information from adapter 106 and destined for the host and the receive side receives information from adapter 106 and destined for the host system.

Arbiter 107 is also coupled to a DMA optimizer module 107A (may also be referred to as module 107A) that is coupled to plural DMA units (for example, 129 and 135). Module 107A is described below in detail with respect to FIGS. 2A-2C and 3.

DMA Optimization:

In one aspect of the present invention, based on an incoming Fibre Channel frame size, and maximum payload size allowed by PCI-Express, DMA arbitration sizing/priorities are enabled, disabled or modified to control DMA write request sizing. This allows write requests to be processed efficiently without significantly reducing read request processing.

In order to optimize read/write request performance, a maximum burst size for processing write requests is selected. Various maximum burst size may be selected, for example, 512 bytes, 1024 bytes, 1536 bytes, 2048 bytes or any other size.

Using a smaller burst size (for example, 512 bytes) provides more opportunities to send read DMA requests. Larger burst sizes allow for more efficient write request processing.

Module 107A balances the need for sending read requests without unduly slowing the write request processing, in one aspect of the present invention as described below with respect to FIGS. 2A, 2B, 2C and 3.

It is noteworthy that read requests are sent without data and read request processing is completed after data is transferred from host via adapter 106 to a storage device.

Figure 2A:
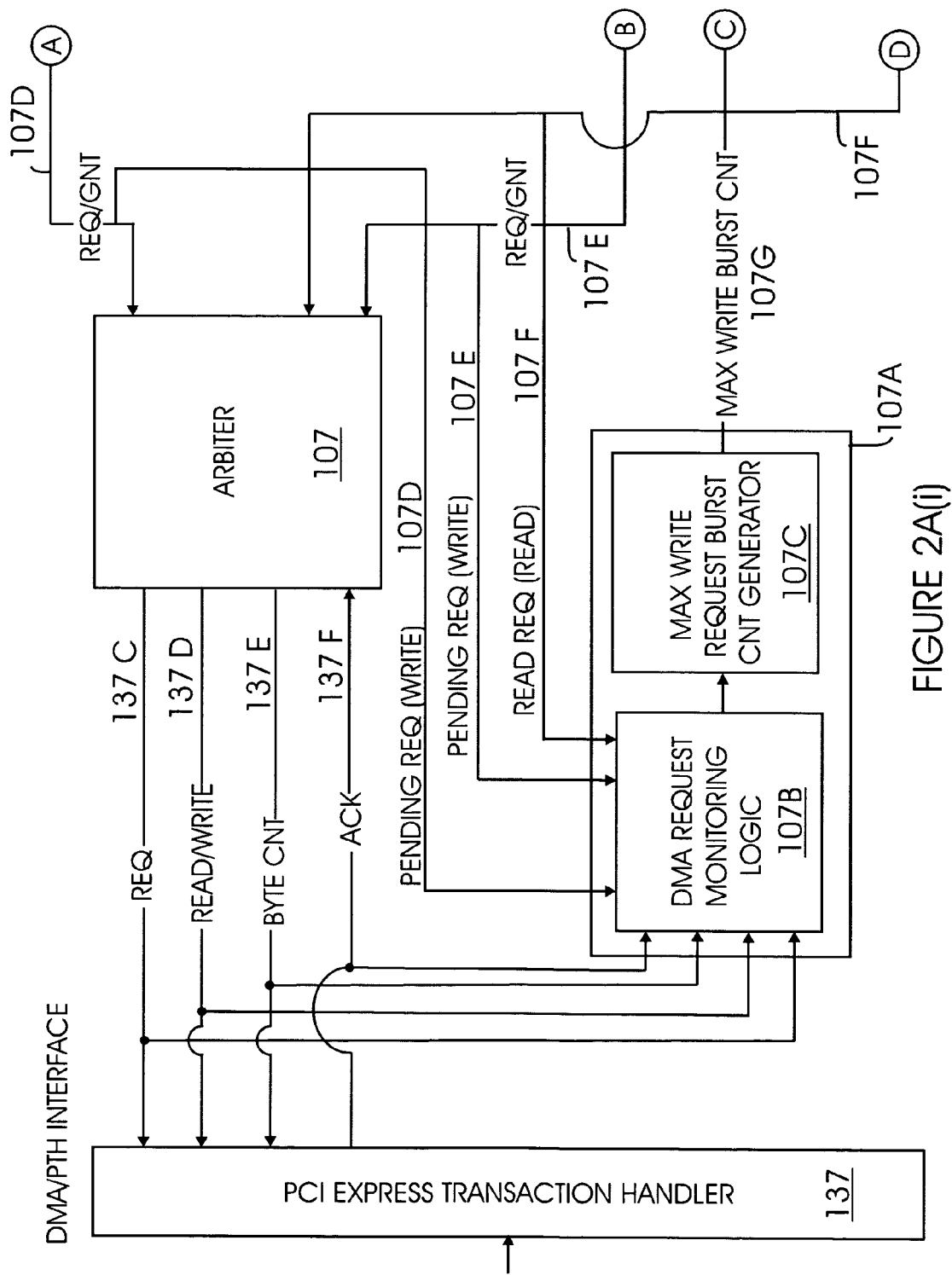
FIGS. 2A, 2B and 2C show block/logic diagrams for optimizing DMA read and write requests, according to one aspect of the present invention.

FIG. 2A shows arbiter 107 functionally coupled with module 107A. Plural DMA channels (for example, 129 and 135) are coupled with arbiter 107. Each DMA channel has a request pipeline (for example, 129B and 135B) and a segmentation module (for example 129A and 135A). Sequencer 109 and 112 send channel task commands (129C and 135C) to DMA channels 129 and 135, respectively. The commands are used to generate a request to arbiter 107 (for example, 107D and 107E).

Transmit side DMA channel 135 also includes a read channel 135D that issues read requests 107F to arbiter 107.

Segmentation modules 129A and 135A segment a DMA transfer into segments (or blocks). Segmentation modules 129A and 135A also operate based on certain rules, for example, when and how data blocks should be segmented. These rules can be turned on or off by the firmware.

Module 107A includes a DMA request monitoring logic 107B (may also be referred to as "logic 107B" or "module 107B") that monitors both read and write requests. Logic 107B receives information regarding pending requests (for example, 107D, 107E and 107F). Output from logic 107B is sent to a maximum write request burst count generator (may also be referred to as "generator") 107C that sends the maximum burst count 107G to segmentation modules 129A and 135A.

Arbiter 107 generates signal 137C that indicates a currently active request (i.e. a request that has won arbitration). Signal 137D indicates if the request is for a read or write operation. Signal 137E shows the byte count and signal 137F is the acknowledgement after a request is completed.

Figure 2B:
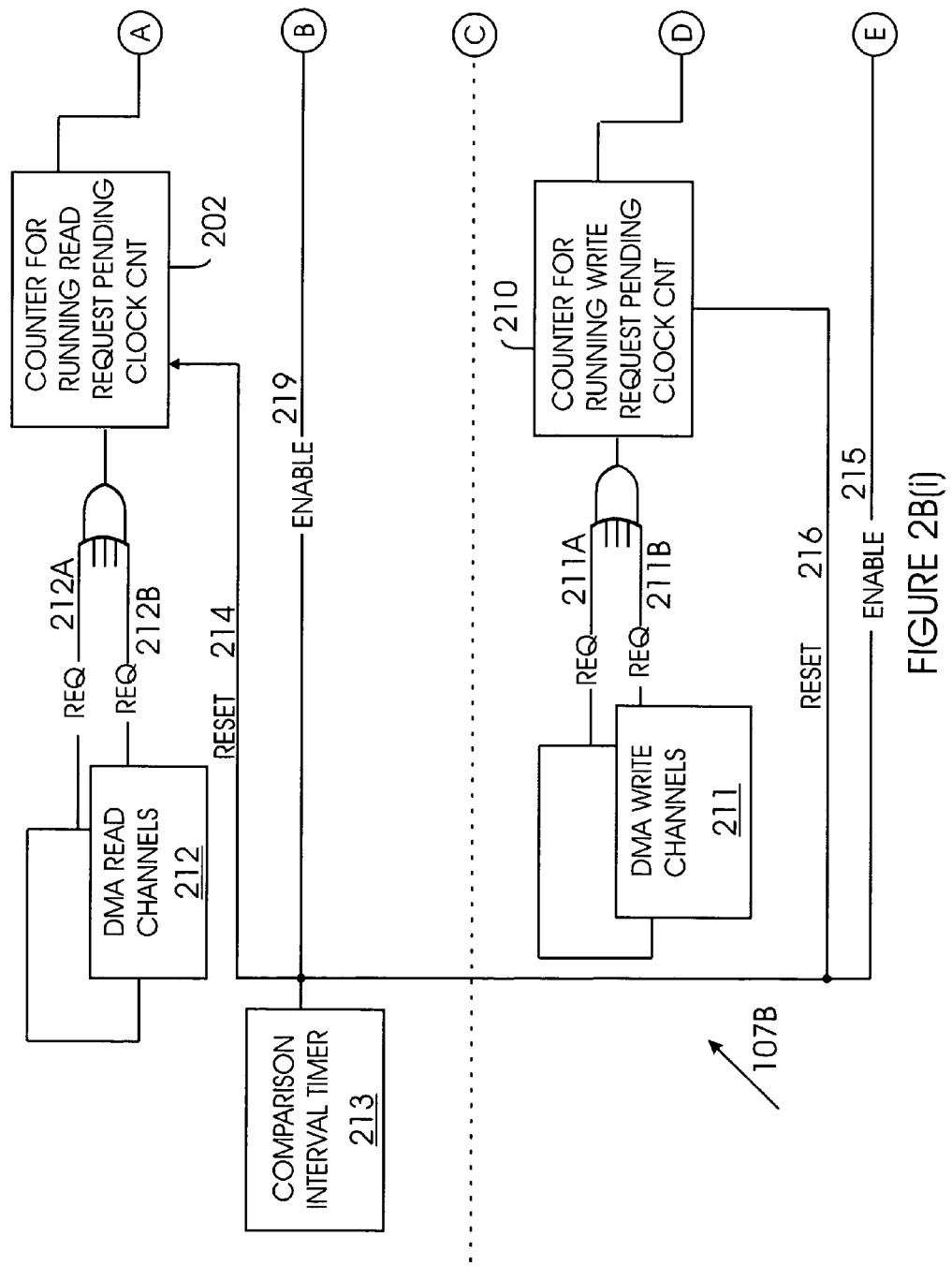

Read/Write Channel Utilization Rate Comparison:

FIG. 2B shows a block diagram for determining the utilization rate for read and write requests. Utilization rate in this context means the number of clocks in a timer interval when a DMA read or write request is pending (or the ratio of clocks used per timer interval and the total clocks per timer interval). Logic for determining the read utilization rate is shown as 200A and logic for determining write path utilization rate is shown as 200B.

DMA read channels 212 (similar to 135D) issue DMA read requests 212A and 212B (similar to 107F). Pending read requests 212A and 212B are input into counter 202 that maintains a running count of all clocks where read requests are pending in a given timer interval, whose period is provided by external timer 213. Counter 202 is reset by signal 214 after every timer interval. A pending read request clock count is compared by comparator 201 to a number of clocks per timer interval 218. A request may be designated as "pending" if the request is pending (or unacknowledged) for multiple clocks and increments counter 202.

Comparator 201 is enabled by signal 219 from timer 213. Comparator 201 provides the number of clocks with pending requests in a given timer period.

Output 201A from comparator 201 is sent to another comparator 204 that also receives input 205A from a threshold register 205. Comparator 201 compares 201A with threshold value 205A. Register 205 holds threshold value 205A for pending read requests.

Based on the comparison, comparator 204 generates signal 203 that is sent generator 107C (FIG. 2C) based on which the maximum write burst size may be adjusted, as described below with respect.

The write side logic in segment 200B operates similar to the logic elements in 200A. DMA channels 211 generate the pending requests (211A and 211B). Counter 210 is similar to counter 202 and is reset by signal 216.

Comparator 206 (enabled by signal 215) is similar to comparator 201. Comparator 207 (enabled by signal 215) is similar to comparator 204. Threshold register 208 stores threshold values (208A) for the write side similar to threshold register 205. Comparator 207 compares output 206A with a threshold value 208A. Based on the comparison, comparator 207 generates signal 209 that is sent to generator 107C (FIG. 2C) based on which the maximum write burst size may be adjusted, as described below with respect.

Figure 2C:
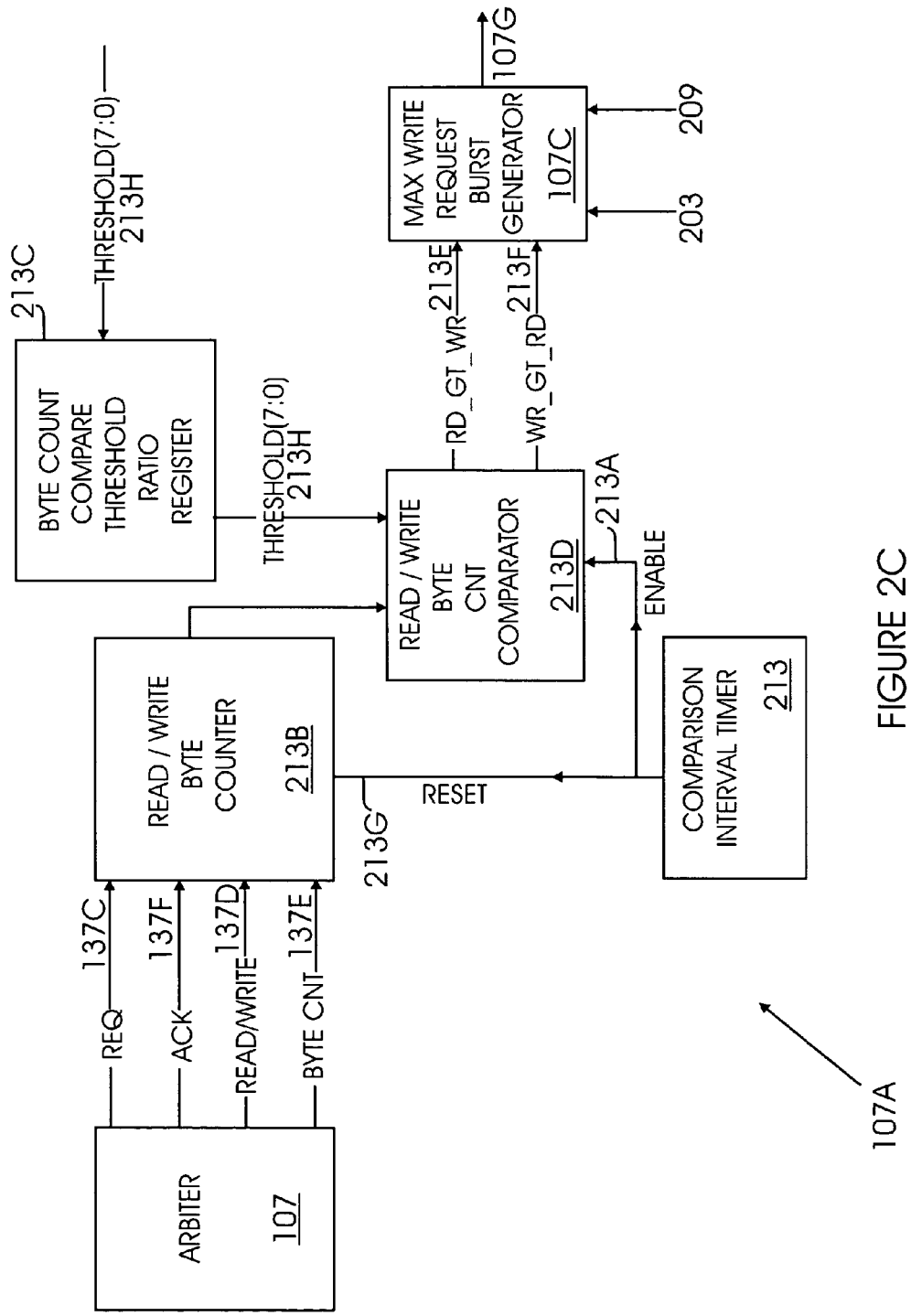

Read/Write Throughput Rate Evaluation:

FIG. 2C shows a logic diagram for comparing read/write operation throughput rates. Throughput in this context means the number of bytes transferred for a read/write operation within a timer interval (provided by 213). The comparison is performed to determine the ratio between the read and write throughput rate on a per timer interval basis. The ratio is compared to a threshold value that provides a range of acceptable values. Based on the comparison, adjustments are made to the maximum write burst count at which data is written for a write request.

The threshold value may be represented as a percentage value, for example, a threshold value greater than 0 and less than 100%. If the ratio is within a certain value, for example, greater or equal to 1.0−threshold value and less or equal to 1.0+threshold value, then no adjustment is made.

Turning in detail to FIG. 2C, counter 213B counts the running read/write byte counts. Counter 213B detects if a request is acknowledged (ACK 137F) and if it is a read request (READ/WRITE signal 137D), then the read byte count (BYTE/CNT 137E) is increased. The same is performed for a write request. Counter 213B is reset by signal 213G from timer 213.

The running read/write byte count from counter 213B is input to comparator 213D that also receives a threshold value 213H from a register 213C. Comparator 213D is enabled by signal 213A. Comparator 213D performs a relative comparison of read/write throughput rates to determine how far apart the throughput rates for read and write requests can be, before any adjustments to maximum write burst count are made.

Firmware for HBA 106 loads the threshold range value 213H (as described above) in register 213C. It is noteworthy that the threshold value 213H may be pre-set or loaded dynamically.

A read throughput rate greater than the write throughput rate is shown as signal 213E, while a write throughput rate greater than the read throughput rate is shown as signal 213F. Signals 203, 209, 213E and 213F are sent to generator 107C. Based on the signal values, as described below, signal 107G is generated.

The term "signal" as used throughout this specification includes a command and/or bit value.

Figure 3:
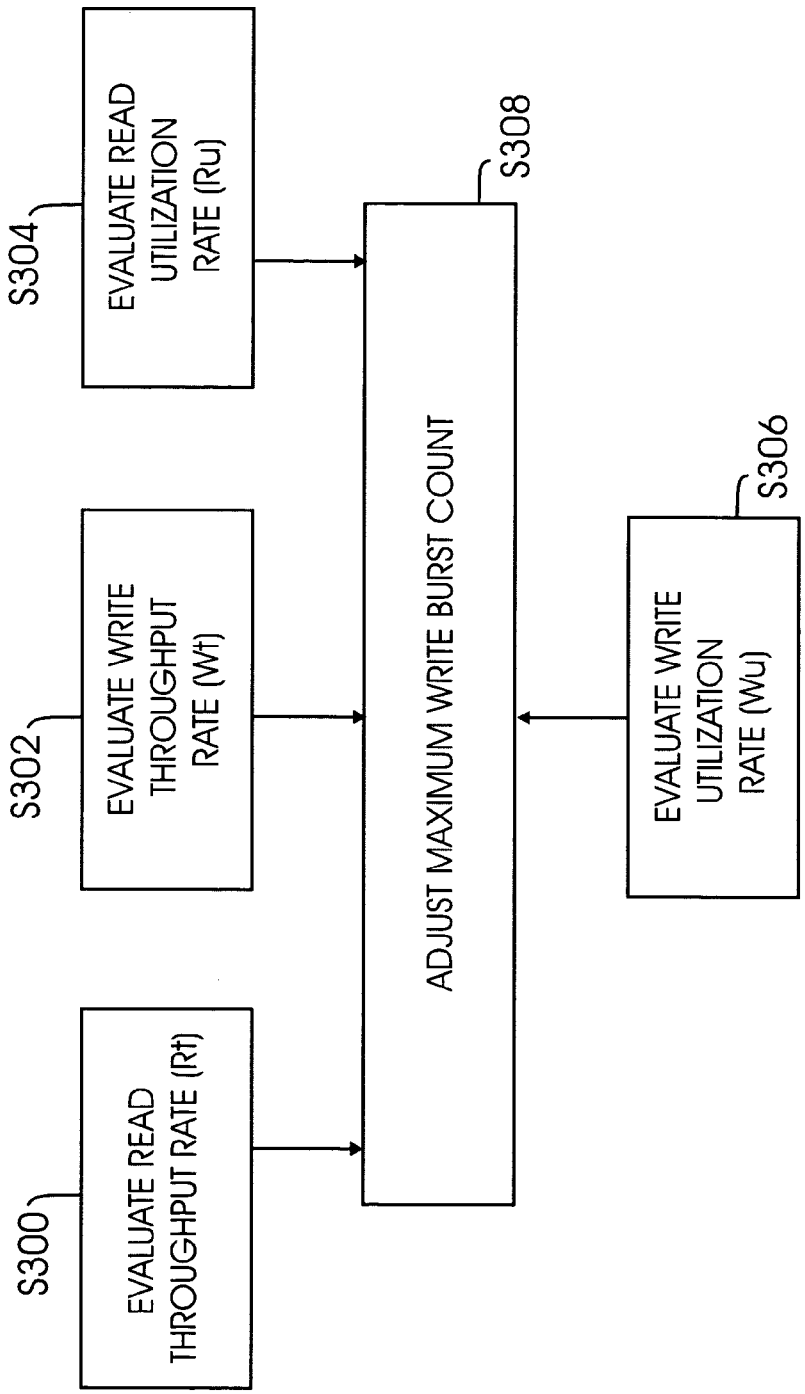
FIG. 3 shows a flow diagram for optimizing DMA read and write requests, according to one aspect of the present invention.

Process Flow:

FIG. 3 shows a flow diagram for optimizing DMA read and write request processing, according to one aspect of the present invention. Steps S300, S302, S304 and S306 are performed simultaneously.

In step S300, read throughput rate (Rt) is evaluated, as described above with respect to FIG. 2C. Signal 213E is generated if Rt is greater than the write throughput rate (Wt).

In step S302, the write throughput is evaluated, as described above with respect to FIG. 2C. Signal 213F is generated if the Wt is greater than Rt.

In step S304, read utilization rate (Ru) is evaluated, as described above with respect to FIG. 2B. Signal 203 is generated after the evaluation and sent to generator 107C.

In step S306, write utilization rate (Wu) is evaluated, as described above with respect to FIG. 2B. Signal 209 is generated after the evaluation and sent to generator 107C.

Based on signals 213E, 213F, 203 and 209, in step S308 adjustments are made to the maximum write burst size. Signal 107G is generated and sent to module 135A to adjust segmentation, if needed.

If both Wu and Ru are higher than their respective threshold values and Rt is relatively greater than Wt, then the maximum write burst size is increased. This will process pending write requests faster.

If both Wu and Rt are higher than their respective threshold values, and Wt is relatively greater than Rt, then the maximum write burst size is decreased. This will allow read requests to be processed faster and optimize overall processing of DMA requests.

Besides the throughput and utilization rates, other factors may also be used to adjust DMA write requests to create time windows for processing read requests at write request boundaries. Module 107A may be configured to use rules similar to those used by PTH 137 to size DMA requests. This can be used to limit the size of write requests and increases the frequency with which read requests are processed.

The following are some of the rules used to size the DMA write requests:

128 k-byte address boundary: PCI-Express specification recommends that 128 byte boundaries be used during write requests. If a first PCI-Express write packet does not begin on a 128-byte boundary, then the packets following the first packet are aligned such that subsequent packets are at 128-byte boundary. Module 107A may be used to align the boundaries by sizing the DMA request such that two DMA requests are formed, and this allows an additional read request to be inserted when the 128 byte alignment occurs for a DMA write request.

4 KB address boundary: PCI-Express specification requires that read and write requests do not cross a 4 KB address boundary. If a DMA request crosses a 4 KB boundary, then PTH 137 splits the requests into two different packets. Module 107 is used to size DMA requests such that they are only split at the 4 KB boundary for write requests and allows for an additional DMA read request to be inserted when the alignment occurs.

Max Payload Size: PCI-Express requires that write requests and read responses do not contain more data than a specified payload size that can be programmed by a host. If a DMA write request exceeds the maximum payload size, then it can be split into two different packets by splitting the DMA requests into 2 DMA requests. In this case, DMA write requests are split by module 107A and hence an additional read request may be inserted when maximum payload sizing occurs for DMA write requests.

It is noteworthy that processor 106A can read PCI-Express configuration registers located at PCI port logic 137B. DMA channel write request sizing registers (not shown) are programmable by processor 106A. Hence, processor 106A can program the register bits (not shown) based on maximum payload size or other system configuration settings.

It is noteworthy that the foregoing DMA processing may be adjusted statically or dynamically, and module 107A may be enabled or disabled by processor 106A.

For static implementation, firmware for HBA 106 is used to set the maximum write count to a certain size, for example, 512K, 1K, 1.5K, 2K or any other size, and is adjusted based on the adaptive aspects of the present invention, described above.

For a dynamic implementation, an initial burst count value is selected, which is based on firmware settings (for example, 512K, 1K, 1.5K, 2K or any other size). At any given time, the value is adjusted when read or write throughput needs to be increased, as described above.

Although the present invention has been described with reference to specific embodiments, these embodiments are illustrative only and not limiting. Many other applications and embodiments of the present invention will be apparent in light of this disclosure and the following claims.

What is claimed is:

1. A storage area network ("SAN"), comprising:
a host computing system with a host memory interfacing with a host bus adapter (HBA), where the HBA enables transfer of information to and from the host memory to a network storage system, and the HBA includes:
(a) a transmit side direct memory access (DMA) module that generates a DMA read request to transfer information stored in the host memory to the networked storage system;
(b) a receive side DMA module that generates a DMA write request that transfers information received from the networked storage system to the host memory;
(c) an arbitration module that receives the DMA read request and the DMA write request to grant access to a bus for transferring information to and from the host memory; and
(d) a DMA optimizer module that receives information from the arbitration module regarding a currently active DMA request that has been granted; information regarding whether the currently active DMA request is a read request or a write request; and a byte count value for the currently active DMA request; where the DMA optimizer module adjusts a write burst size based on a first output from a DMA request monitoring logic and a second output from a logic that determines a difference between an amount of data transferred for DMA read requests and DMA write requests during a time interval; wherein the DMA request monitoring logic determines if a DMA read or a DMA write request is pending based on a comparison of a number of clocks for DMA read requests that have not been granted by the arbitration module within a time interval to a threshold value and a comparison of a number of clocks for DMA write requests that have not been granted by the arbitration module within a time interval to a threshold value; and the DMA request monitoring logic generates the first output based on the comparison, where the first output is used by the DMA optimizer module for adjusting the write burst size.

2. The SAN of claim 1, wherein the logic compares an amount of data transferred for the DMA read requests and an amount of data transferred for the DMA write requests within the time interval to a threshold value and the threshold value is loaded by the HBA firmware.

3. The SAN of claim 1, wherein the threshold value for comparing the number of clocks for the pending DMA read requests is loaded in a register by the HBA firmware.

4. The SAN of claim 1, wherein the threshold value for comparing the number of clocks for the pending DMA write requests is loaded in a register by the HBA firmware.

5. The SAN of claim 1, wherein if the number of clocks for the pending DMA read requests within the time interval is greater than the threshold value and the number of clocks for the pending DMA write requests within the time interval is greater than the threshold value; and if the amount of data transferred within the time interval for the DMA read requests is greater than the amount of data transferred for the DMA write requests within the time interval, then the write burst size is increased.

6. The SAN of claim 1, wherein if the number of clocks for the pending DMA read requests within the time interval is greater than the threshold value and the number of clocks for the pending DMA write requests within the time interval is greater than the threshold value; and if the amount of data transferred within the time interval for the DMA write requests is greater than the amount of data transferred for the DMA read requests within the time interval, then the write burst size is decreased.

7. The SAN of claim 1, wherein the write burst size is adjusted dynamically after being set to an initial value by the HBA firmware executed by a HBA processor.

8. A host bus adapter ("HBA") that enables communication between a host computing system with a host memory and a networked storage system, comprising:
  (a) a transmit side direct memory access (DMA) module that generates a DMA read request to transfer information stored in the host memory to the networked storage system;
  (b) a receive side DMA module that generates a DMA write request that transfers information received from the networked storage system to the host memory;
  (c) an arbitration module that receives the DMA read request and the DMA write request to grant access to a bus for transferring information to and from the host memory; and
  (d) a DMA optimizer module that receives information from the arbitration module regarding a currently active DMA request that has been granted; information regarding whether the currently active DMA request is a read request or a write request; and a byte count value for the currently active DMA request; where the DMA optimizer module adjusts a write burst size based on a first output from a DMA request monitoring logic and a second output from a logic that determines a difference between an amount of data transferred for DMA read requests and DMA write requests during a time interval; wherein the DMA request monitoring logic determines if a DMA read or a DMA write request is pending based on a comparison of a number of clocks for DMA read requests that have not been granted by the arbitration module within a time interval to a threshold value and a comparison of a number of clocks for DMA write requests that have not been granted by the arbitration module within a time interval to a threshold value; and the DMA request monitoring logic generates the first output based on the comparison, where the first output is used by the DMA optimizer module for adjusting the write burst size.

9. The HBA of claim 8, wherein the logic compares an amount of data transferred for the DMA read requests and an amount of data transferred for the DMA write requests within the time interval to a threshold value and the threshold value is loaded by the HBA firmware.

10. The HBA of claim 8, wherein the threshold value for comparing the number of clocks for the pending DMA read requests is loaded in a register by the HBA firmware.

11. The HBA of claim 8, wherein the threshold value for comparing the number of clocks for the pending DMA write requests is loaded in a register by the HBA firmware.

12. The HBA of claim 8, wherein if the number of clocks for the pending DMA read requests within the time interval is greater than the threshold value and the number of clocks for the pending DMA write requests within the time interval is greater than the threshold value; and if the amount of data transferred within the time interval for the DMA read requests is greater than the amount of data transferred for the DMA write requests within the time interval, then the write burst size is increased.

13. The HBA of claim 8, wherein if the number of clocks for the pending DMA read requests within the time interval is greater than the threshold value and the number of clocks for the pending DMA write requests within the time interval is greater than the threshold value; and if the amount of data transferred within the time interval for the DMA write requests is greater than the amount of data transferred for the DMA read requests within the time interval, then the write burst size is decreased.

14. The HBA of claim 8, wherein the write burst size is adjusted dynamically after being set to an initial value by the HBA firmware executed by a HBA processor.

15. A method for adjusting a write burst size for write direct memory access (DMA) requests in a host bus adapter ("HBA") that enables communication between a host computing system with a host memory and a networked storage system, comprising:
  generating a plurality of DMA read requests for transferring information stored in the host memory to the networked storage system;
  generating a plurality of DMA write requests to transfer information received from the network storage system to the host memory;
  determining a difference between an amount of data transferred for granted DMA read requests and granted DMA write requests during a time interval;
  comparing a number of clocks for DMA read requests that have not been granted within a time interval to a threshold value, the comparison being used to determine if a DMA read request is pending;
  comparing a number of clocks for DMA write requests that have not been granted within a time interval to a threshold value, the comparison being used to determine if a DMA write request is pending; and
  adjusting the write burst size based on the difference between the amount of data transferred for the DMA read requests and the DMA write requests during the time interval; and the comparison of the number of clocks for the DMA read requests that have not been granted by the arbitration module within the time interval to the threshold value and the comparison of the number of clocks for the DMA write requests that have not been granted by the arbitration module within the time interval to the threshold value.

16. The method of claim 15, wherein a logic compares an amount of data transferred for the DMA read requests and an amount of data transferred for the DMA write requests within the time interval to a threshold value and the threshold value is loaded by the HBA firmware.

17. The method of claim 15, wherein the threshold value for comparing the number of clocks for the pending DMA read requests is loaded in a register by the HBA firmware and the threshold value for comparing the number of clocks for the pending DMA write requests is loaded in a register by the HBA firmware.

18. The method of claim 15, wherein if the number of clocks for the pending DMA read requests within the time interval is greater than the threshold value and the number of clocks for the pending DMA write requests within the time interval is greater than the threshold value; and if the amount of data transferred within the time interval for the DMA read requests is greater than the amount of data transferred for the DMA write requests within the time interval, then the write burst size is increased.

19. The method of claim 15, wherein if the number of clocks for the pending DMA read requests within the time interval is greater than the threshold value and the number of clocks for the pending DMA write requests within the time interval is greater than the threshold value; and if the amount of data transferred within the time interval for the DMA write requests is greater than the amount of data transferred for the DMA read requests within the time interval, then the write burst size is decreased.

20. The method of claim 15, wherein the write burst size is adjusted dynamically after being set to an initial value by the HBA firmware executed by a HBA processor.

* * * * *